July 26, 1932.  L. VON REIS  1,868,860

ROLLER CONVEYER FOR GLASS PLATES

Filed Dec. 3, 1928

Inventor:
Lambert von Reis
per
Attorneys.

Patented July 26, 1932

1,868,860

UNITED STATES PATENT OFFICE

LAMBERT VON REIS, OF HERZOGENRATH, GERMANY, ASSIGNOR, BY MESNE ASSIGNMENTS, TO THE AMERICAN BICHEROUX COMPANY, A CORPORATION OF DELAWARE

ROLLER CONVEYER FOR GLASS PLATES

Application filed December 3, 1928, Serial No. 323,486, and in Germany December 8, 1927.

This invention relates to roller conveyers more particularly designed for use in transporting glass plates or glass ribbons to be annealed through leers.

It is well-known that the rollers of such conveyers are generally subject to undue deflection under the action of the load and temperature, especially in case they have a great unsupported length as is necessary for transporting glass plates of great width, and it is the object of the present invention to provide a novel roller construction by which the deflection of the rollers in the leer is avoided or at least considerably reduced. According to the invention the rollers are made of an outer tubular working member and an inner supporting shaft, this shaft being shaped and mounted in such a manner that when in a bent state under the action of the load and temperature it supports the tubular member at points intermediate its ends and keeps it straight.

In the accompanying drawing Figs. 1 to 4 illustrate longitudinal sections through various forms of conveyer rollers constructed in accordance with the invention.

As shown in the several figures, the roller consists of an outer tubular working member $a$ and an inner supporting shaft $b$ which is mounted in bearings $c$. The tubular member $a$ may be surrounded by a heat insulating cover $f$ and is supported at its ends in bearings $i$, as shown in Fig. 1.

The supporting shaft and the outer tube endure by their own weight, the weight of the insulating cover and especially by the weight of the glass plates to be transported a certain deflection, which is moreover dependent on the height of temperature which the several parts adopt in the leer.

Figure 2:
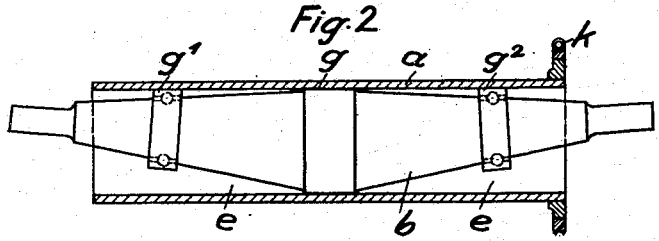
Figure 3:
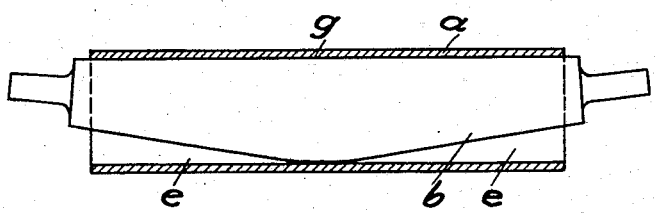

In order to neutralize the deflection, the inner supporting shaft $b$ is not arranged centrically in the tube $a$ but its bearings are adjusted with their centres at a level which is higher than the central longitudinal axis of the tube by an amount corresponding to the deflection of the system. To this end the shaft bearings $c$ are made adjustable. In Figs. 1–3 the supporting shaft is shown in the loaded, i. e. bent state.

Figure 1:
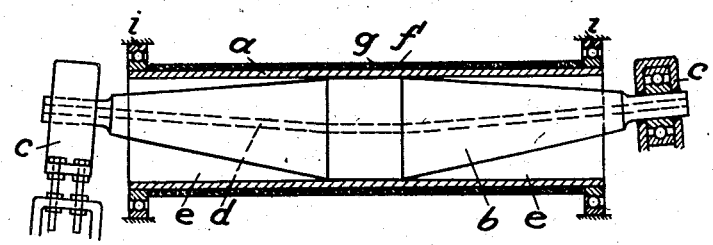

In the form according to Fig. 1, when the roller is loaded, the middle of the tube $a$ is supported at $g$ by the supporting shaft $b$ in such a manner that it is held in one common plane, that is to say on the same level with the tube ends. Therefore, the tube can only bend between the middle, where it is supported at $g$, and the outer bearings $i$, so that the deflection theoretically amounts only to $\frac{1}{16}$ of the deflection ordinarily incurred in rollers supported only at their ends.

In the embodiment illustrated by Fig. 2, the tube $a$ when in loaded condition is supported at three points $g$, $g^1$ and $g^2$, the two supporting points $g^1$ and $g^2$ being preferably formed by roller bearings in order to avoid unfavorable friction at the tube wall.

The shaft $b$ of the roller shown in Fig. 3 is of such a shape that when deflected under the action of the load the upper edge of the shaft forms a straight supporting line on which the tube $a$ when loaded rests. This is rendered possible by curving the upper edge of the supporting shaft upwards exactly in accordance with the line of elastic deflection.

Figure 4:
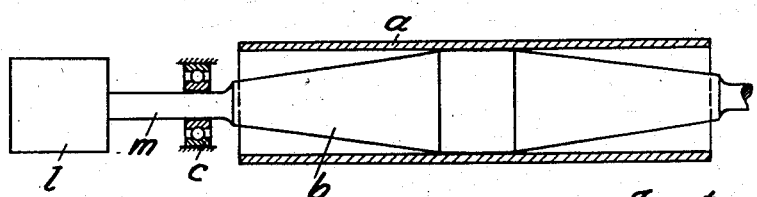

In the form of roller shown in Fig. 4, the supporting shaft $b$ is extended beyond the outer bearings $i$ and loaded by weights $l$ in such a manner that the points of the elastic line corresponding to the points of support are situated on an almost straight line whereby deflection is reduced to about $\frac{1}{5}$ as is well-known. The weights $l$ are used with advantage in case different rollers of the conveyer show different deflections due for instance to irregular temperatures and non-uniform material. By a proper selection of the weights the rollers may be uniformly adjusted without it being necessary to adjust the bearings.

In all of the forms of conveyer rollers shown, the supporting member $b$ may stand still or take part in the rotation of the working member $a$. As regards the driving of the conveyer rollers, either the outer tube or the inner shaft or both members are driven. Fig. 2 shows for example a gear $k$ which imparts rotation to the roller by acting on the tube $a$.

In order to prevent the supporting shaft from adopting a temperature at which the strength and coefficient of elasticity of the material considerably decrease, there may be provided a suitable cooling by water, air or the like. The shaft $b$ may for example be provided with an axial channel $d$, Fig. 1, through which to pass a cooling medium. There may also be effected a cooling of the tube $a$ in the spaces $e$, Figs. 1–3. The transmission of heat from the tube $a$ to the shaft $b$ may be further decreased by providing the supporting shaft with a suitably formed surface.

As bending of the conveyer rollers constructed in accordance with the invention is avoided or at least reduced to a minimum, the evenness of the glass plates being transported is fully maintained and favorable annealing conditions are produced. Besides, the life of the insulating cover of the rollers is prolonged because same is no longer subjected to the tensile and compressive stresses which are otherwise entailed by the strong deflection and which the ordinary insulating material such as asbestos can only slightly resist.

Having thus described my invention, what I claim as new and desire to secure by Letters-Patent is:—

1. In a conveyer supporting system for hot sheet glass the combination with a hollow cylindrical roller, of bearings rigidly supporting the ends of the roller, a shaft projecting within the roller and having an enlarged portion therein, contacting with and supporting the inner surface of the roller intermediate of its length.

2. In a conveyer supporting system for hot sheet glass the combination with a hollow cylindrical roller, of bearings supporting the ends of the roller, a shaft projecting within the roller and having an enlarged portion therein, contacting with and supporting the inner surface of the roller intermediate of its length, and roller bearings between the cylindrical roller and the shaft on each side of the center of the former.

3. In a conveyer supporting system for hot sheet glass the combination with a hollow cylindrical roller, of bearings supporting the ends of the roller, a shaft projecting within the roller and contacting with the interior thereof to support the same, bearings for the shaft, and means for depressing the ends of the shaft beyond the bearings to bend the shaft between the bearings.

4. In a conveyer supporting system for hot sheet glass the combination with a hollow cylindrical roller, of bearings supporting the ends of the roller, a shaft projecting within the roller and having an enlarged portion therein, contacting with and supporting the inner surface of the roller intermediate of its length, bearings for the shaft, and means for depressing the end of the shaft to bend the shaft between the bearings.

In testimony whereof I have signed my name to this specification.

LAMBERT von REIS.